No. 895,310. PATENTED AUG. 4, 1908.
J. B. SIMMONS.
RUNNER FOR GO-CARTS.
APPLICATION FILED NOV. 5, 1907.
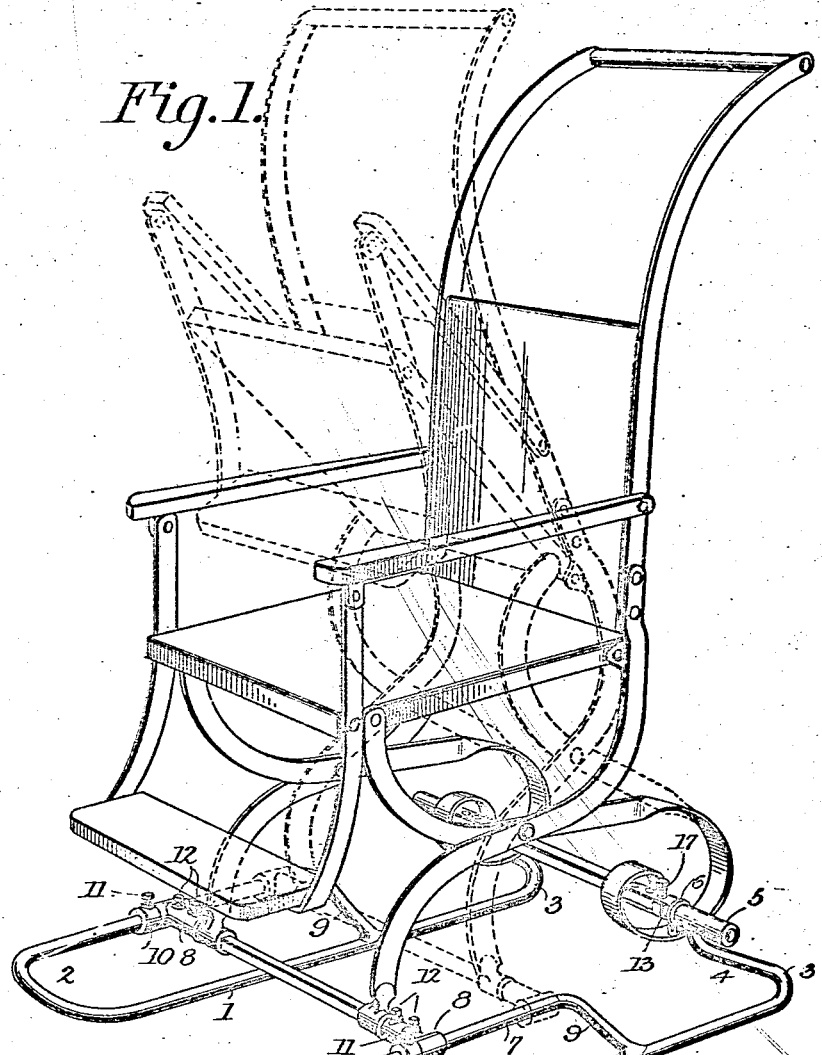
Fig.1.
Fig.2.
Fig.3.
Fig.4.
Witnesses
N. F. Davies
C. D. Davis
Inventor
Jacob B. Simmons
by R. H. Bishop
Attorney

UNITED STATES PATENT OFFICE.

JACOB B. SIMMONS, OF JOHNSTOWN, PENNSYLVANIA.

RUNNER FOR GO-CARTS.

No. 895,310.  Specification of Letters Patent.  Patented Aug. 4, 1908.

Application filed November 5, 1907. Serial No. 400,872.

*To all whom it may concern:*

Be it known that I, JACOB B. SIMMONS, a citizen of the United States of America, residing at Johnstown, in the county of Cambria and State of Pennsylvania, have invented certain new and useful Improvements in Runners for Go-Carts, of which the following is such a full, clear, and exact description as will enable others skilled in the art to which it appertains to make and use the same.

This invention is a runner attachment for children's go-carts, the object of the invention being to provide runners which may be readily attached to the cart without destroying or disarranging the running-gear, which will permit the cart to be quickly and easily folded without manipulation of the runners and which will be simple and inexpensive in construction.

With these objects in view, the invention consists in certain novel features of the device illustrated in the accompanying drawings as will be hereinafter first fully described and then particularly pointed out in the claims.

In the drawings, Figure 1 is a perspective view of a go-cart fitted with my improved runners, the folded position of the cart being indicated by dotted lines. Fig. 2 is a sectional view through the front axle, Fig. 3 is a similar view taken through the rear axle and Fig. 4 is a detail perspective view of a spring hook which is an element of the device.

The runners are preferably formed of metal tubing and have the ground portions or treads, 1, with the forwardly and upwardly turned front ends, 2, and the upstanding rear ends, 3. The extremities of the rear portions of the runners are carried forward a short distance, as shown at 4, and are provided at their tips with transverse sleeves or bearings, 5, adapted to receive the ends of the rear axle and having annular flanges, 6, at their inner ends. Extending rearward from the front tips of the runners, are the bars or rods, 7, which form ways or supports for sleeves or bearings, 8, which carry the ends of the front axle. To prevent collapse of the ways 7, the rear ends of the same are connected with the treads of the runners by braces, 9, as will be readily understood.

The sleeves or bearings 8 are provided at their outer ends with eyes, at right angles to their main portions, which engage the ways 7 and are free to slide thereon, the extent of the sliding movement being determined by the braces 9 at the rear and by the stops, 10, at the front. These stops 10 are rings or collars fitting around the ways or supports 7 and secured at the proper point by set screws, 11, as will be readily understood. By having the front stops adjustable, they may be adjusted to the point necessary to permit the cart to be fully extended when it is to be used a single pair of runners being thus adapted for use on a variety of carts. Set screws, 12, are mounted in the sleeves 8 to bear upon the ends of the front axle and secure them in the sleeves so securely as to prevent the runners spreading apart at their front ends while in use. The rear axle is provided with spring hooks, 13, arranged to engage the flanges 6 of the sleeves 5 and thereby prevent spreading of the runners at their rear ends. In the construction illustrated, the hooks are in the form of plates resting against a side of the axle and having their outer ends bent into a U-shaped portion to pass over the flanges with notches, 14, in their end edges to fit around the sleeve. On the side edges of the plates are lips, 15, which bear against the sides of the axle to prevent lateral movement of the plates and the plates are carried by pins, 16, which extend through the axle. Springs, 17, coiled around the pins between the axle and the heads of the pins, serve to normally hold the plates against the axle as will be readily understood the plates themselves being unsecured.

From the foregoing description, taken in connection with the accompanying drawings, it will be seen that I have provided a runner attachment which may be readily attached to and detached from a go-cart without defacing the cart in any way. After removing the wheels of the cart, the axles are fitted in the rear and front sleeves and the cart may then be utilized upon snow just as readily as it is used ordinarily when wheeled. When in use, the front axle will carry the sleeves to which it is fitted against the stops and a push applied to the handle of the cart will then cause it to slide forward. When it is desired to fold the cart it is necessary only to swing the seat upward toward the handle in the usual manner which will cause the front axle to move rearward, this action taking place just as though the ordinary wheels were in use inasmuch as the sleeves 8 are not fastened to the runners but are simply mounted loosely thereon. To detach the runners from the cart, it is necessary only to loosen the set screws in the front sleeves and disengage the spring hooks from the rear sleeves after which the runners may be slipped laterally from the axles.

The device is extremely simple in its construction and may be applied to any folding go-cart. The parts may be packed in a very small space for transportation and will occupy very little room when not in use. The spring hooks on the rear axle can be easily fitted thereto by any mechanic or a rear axle may be supplied with each pair of runners to be substituted for the rear axle of the cart. The front axle of the cart ordinarily being shorter than the rear axle, the arrangement of sleeves shown and described compensates for that inequality without destroying the desired parallelism of the runners.

Having thus described my invention, what I claim and desire to secure by Letters-Patent is:—

1. A pair of runners for go-carts having a pair of fixed transverse sleeves at their rear ends to receive the rear axle of the cart and having ways in their front portions, and free slidable sleeves mounted loosely on the said ways and arranged to receive the front axle.

2. A pair of runners for go-carts having fixed sleeves at their rear ends to receive the rear axle, slidable sleeves loosely mounted on the front portions of the runners, and stops in the path of said sleeves between which they may move freely.

3. A pair of runners for go-carts having transverse sleeves to receive the rear axle, ways in the front portions of the runners, sleeves slidably mounted on the said ways and arranged to receive the front axle, and adjustable stops on the ways to limit the forward movement of the said sleeves.

4. A runner attachment for go-carts having a fixed bearing for one axle and freely slidable unsecured bearings for the other axle whereby the go-cart may be folded without manipulating the runners or the parts adjacent thereto.

In testimony whereof, I have signed this specification in the presence of two subscribing witnesses.

JACOB B. SIMMONS.

Witnesses:
CHARLES W. WITT,
WILLIAM A. R. SITMAN.